US006756466B2

(12) United States Patent
Okuhira et al.

(10) Patent No.: US 6,756,466 B2
(45) Date of Patent: Jun. 29, 2004

(54) ONE-PART, ROOM TEMPERATURE MOISTURE CURABLE RESIN COMPOSITION

(75) Inventors: Hiroyuki Okuhira, Oiwake Hiratsuka (JP); Naoya Adachi, Oiwake Hiratsuka (JP); Kazunori Ishikawa, Oiwake Hiratsuka (JP); Toshimitsu Takeda, Oiwake Hiratsuka (JP); Yo Kotani, Oiwake Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 10/291,601

(22) Filed: Nov. 12, 2002

(65) Prior Publication Data

US 2003/0139559 A1 Jul. 24, 2003

Related U.S. Application Data

(62) Division of application No. 09/155,097, filed as application No. PCT/JP98/00220 on Jan. 21, 1998, now Pat. No. 6,525,159.

(30) Foreign Application Priority Data

| Jan. 21, 1997 | (JP) | ............................................ 9-008714 |
| Jul. 23, 1997 | (JP) | ............................................ 9-197085 |
| Sep. 4, 1997 | (JP) | ............................................ 9-239586 |
| Nov. 11, 1997 | (JP) | ............................................ 9-308227 |

(51) Int. Cl.$^7$ ............................................ C08G 77/26
(52) U.S. Cl. ............................. 528/38; 528/26; 528/33; 528/27; 556/425; 556/413; 525/477; 525/523
(58) Field of Search ............................. 528/26, 33, 27, 528/38; 525/477, 523; 556/425, 413

(56) References Cited

U.S. PATENT DOCUMENTS

| 2,942,019 A | * | 6/1960 | Pike et al. ................... 556/425 |
| 3,547,886 A | | 12/1970 | Gardner, Jr. et al. |
| 3,993,708 A | | 11/1976 | Brinkmann et al. |
| 4,148,950 A | | 4/1979 | Brindell et al. ............. 427/421 |
| 4,391,958 A | | 7/1983 | Minato et al. ............... 525/504 |
| 4,800,122 A | | 1/1989 | Sallavanti et al. .......... 428/412 |
| 5,319,050 A | | 6/1994 | Kimura et al. ................ 528/12 |
| 5,482,992 A | | 1/1996 | Kimura et al. .............. 524/588 |
| 5,502,096 A | * | 3/1996 | Kimura et al. .............. 524/356 |
| 6,197,882 B1 | * | 3/2001 | Yanagisawa et al. ....... 525/102 |

FOREIGN PATENT DOCUMENTS

| JP | 55-75469 A | 6/1980 |
| JP | 60-186576 A | 9/1985 |
| JP | 63-273630 A | 11/1988 |
| JP | 2-36220 A | 2/1990 |
| JP | 2-238044 A | 9/1990 |
| JP | 3-192183 A | 8/1991 |
| JP | 3-195724 A | 8/1991 |
| JP | 3-263421 A | 11/1991 |
| JP | 5-132541 A | 5/1993 |
| JP | 5-230182 A | 9/1993 |
| JP | 07247294 A | 9/1995 |
| JP | 07247295 A | 9/1995 |
| JP | 08027167 A | 1/1996 |
| JP | 08027447 A | 1/1996 |

OTHER PUBLICATIONS

English Abstract of Japanese Publication No. 03195724, dated Aug. 27, 1991, *Patent Abstracts of Japan*.

* cited by examiner

Primary Examiner—Margaret G. Moore
(74) Attorney, Agent, or Firm—Finnegan, Henderson, Farabow, Garrett, & Dunner, L.L.P.

(57) ABSTRACT

This invention provides a one-part, room temperature moisture curable resin composition which comprises a ketimine prepared by reacting a ketone having a substituent at α position and a polyamine having at least two amino groups within its molecule wherein α position is methylene, and a main polymer which is an epoxy resin and/or a modified silicone having at least two hydrolyzable alkoxysilyl groups in its molecule, and which exhibits good shelf stability and high curing rate once taken out of the container, and which may further exhibit flexibility; a one-part, room temperature moisture curable resin composition which exhibits good shelf stability and curability as well as wet surface adhesion or initial thixotropic properties; a silicon containing compound having ketimine group whose reaction with the epoxy resin during the storage is prevented by the presence of a bulky alkyl group near the ketimine group and which exhibits good shelf stability and curability, and its production method; a one-part, room temperature moisture curable resin composition containing said silicon containing compound adapted as a latent curing agent which exhibits good shelf stability and short curing period once taken out of the container; and a novel method of ketimine synthesis.

7 Claims, No Drawings

ONE-PART, ROOM TEMPERATURE MOISTURE CURABLE RESIN COMPOSITION

This is a division of application Ser. No. 09/155,097, filed Mar. 30, 1999, which is incorporated herein by reference and is now U.S. Pat. No. 6,525,159 and which is a 371 of PCT/JP98/00220, filed Jan. 21, 1998.

TECHNICAL FIELD

This invention relates to a one-part, room temperature moisture curable resin composition adapted for use as an adhesive or a sealant in the field of civil engineering and architecture which exhibits good shelf stability and fast curing rate once taken out of the container, and which may further exhibit flexibility; a one-part, room temperature moisture curable resin composition which exhibits good shelf stability and curability as well as wet surface adhesion or initial thixotropic properties; a silicon containing compound adapted for use as a latent curing agent or a latent catalyst for an adhesive or a sealant in the field of civil engineering and architecture and as a coupling agent for various adhesives which exhibits good shelf stability and curability, and its production method; a one-part, room temperature moisture curable resin composition containing said silicon containing compound adapted for use as an adhesive or a sealant in the field of civil engineering and architecture which exhibits good shelf stability and curability; and a novel method of ketimine synthesis.

BACKGROUND ART

Epoxy resins have been widely used as adhesives, sealants and coating compositions in the fields of civil engineering, architecture, electronic equipment and the like in view of their favorable properties including the excellent adhesion and strength.

Epoxy resins are highly reactive, and when an epoxy resin is mixed with an amine component, it easily reacts with the amine component to cure. Therefore, most epoxy resins have been used in two-part form.

Under such situation, various attempts have been made to develop one-part resin compositions by using a ketimine compound or the like as a latent curing agent. However, no system have been so far been developed that exhibits well balanced shelf stability and curability.

For example, JP-A 5-132541 discloses a technique wherein reactivity during the storage is reduced by using a long chain polyoxylene for the skeleton of the ketimine compound to thereby improve shelf stability. This resin, however, slowly cures when it is taken out of the container and is not a one-part epoxy resin composition of practical level.

In addition, the resin compositions comprising an epoxy resin and a ketimine compound also suffer from the drawback of poor flexibility of the cured product.

On the other hand, organosilicon compounds having ketimine structure are known, and various process of their synthesis and various techniques of their use as a tackifier or a curing agent to be blended in the resin composition are also known. Number of the ketimine group in the molecule of such known compounds are one or two, and in most cases one.

The ketimine compound are synthesized, for example, by a process wherein an alkoxysilane having amino group is reacted with a ketone in the presence of anhydrous sulfate or a molecular sieve (see JP-A 3-263421 and JP-A 7-247295), a process wherein an alkoxysilane having amino group is gradually introduced into a ketone by heating (see JP-A 7-247294), or a process wherein an organic unsaturated compound having ketimine group is reacted with hydroalkoxysilane in the presence of a transition metal catalyst (see JP-A 4-83439). Many of the processes for synthesizing organosilicon compound having ketimine structure attempts to obtain the product in monomer form by suppressing the side reaction, namely, polymerization of the alkoxysilane moiety, for example, by using a dehydrating agent which removes the water generated by the reaction between the amine and the ketone.

There is also disclosed a process wherein a compound having secondary amino group in the molecular skeleton is reacted with an alkoxysilane having a halogen atom to produce a silane coupling agent having two ketimine group in the molecule (see JP-A 8-27167).

With regard to the techniques wherein an organosilane compound having ketimine structure is used as a component to be blended in a composition, there are disclosed a technique wherein an organosilane compound having ketimine structure is used as an additive for imparting adhesive properties and heat resistance to the one-part chloroprene-based adhesive (JP-A 8-27447), a technique wherein an organosilane compound having ketimine structure is used as a curing agent for hot melt epoxy resin which is solid at room temperature (JP-B 57-11582), a technique wherein a β-dicarbonyl compound is reacted with a silane coupling agent with stirring at room temperature for use as a tackifier for a polyurethane or a modified silicone (JP-B 2-19866).

The organosilane compounds having ketimine structure in the disclosed techniques, however, all suffered from insufficient shelf stability and, for example, experienced viscosity increase or gelation with lapse of time when the organosilane compound was mixed with an epoxy resin or a polyurethane resin and stored in sealed condition since nitrogen atom in the imine moiety had high nucleophilicity. Conventional organosilane compounds having ketimine group which have been used as a curing agent for an epoxy resin have been mostly bifunctional, and such bifunctional organosilane compounds have suffered from insufficient shelf stability, and the situation has been worse in the case of multifunctional organosilane compounds having ketimine group.

A plurality of inventions attempting to improve the shelf stability of the one-part, room temperature moisture curable resin compositions have been disclosed. The shelf stability in these inventions, however, have all been improved in the sacrifice of the reactivity itself, and the one-part, room temperature moisture curable resin compositions of such inventions have been far from being practical. For example, a composition prepared by mixing an epoxy resin having an increased molecular weight and a long chain polyether for the skeleton with a ketimine compound is disclosed (See JP-A 5-230182). This composition, however, does not have a curing speed adapted for use in a one-part, epoxy resin composition.

A technology wherein a sterically hindered compound wherein an amine or a thiol is capped with a trialkylsilyl group is used for a latent curing agent is also disclosed (JP-A 1-138221, JP-A 2-36220). This curing agent sensitively reacts with a minute amount of moisture, and undergoes gelation during its storage by contact with a minute amount of moisture.

In addition, epoxy resins have the drawback of low wet surface adhesion in spite of its strong adhesion to a wide variety of materials. In view of such situation, improvement of the wet surface adhesion has been attempted by using a polyamine or a polyamideamine curing agent. Such conventional known attempts have so far failed to develop one-part adhesive because of the insufficient shelf stability.

Improvements in the wet surface adhesion by using a silane coupling agent has been also proposed. The one-part epoxy resin compositions which have so far been proposed have confronted with the difficulty in balancing the shelf stability and the curing rate.

In the meanwhile, one-part curable resin compositions of modified silicone series have suffered from insufficient adhesion to concretes and mortars, and required simultaneous use of an epoxy resin and a latent curing agent for an epoxy resin.

One-part sealants employing the one-part curable resin compositions of modified silicone series have used tin compounds for the curing catalyst, and such sealants have been highly reactive and sensitive to moisture. Therefore, a dehydrating agent such as vinylsilane had to be blended in such sealants to thereby remove the water of a minute amount in the system and maintain the shelf stability. Although the shelf stability has been improved by such means to some extent, the curing rate of the sealant once it is taken out of the container are yet to be improved, and there is a demand for a latent curing agent with better shelf stability. Because of the difficulty in balancing the shelf stability and the curing rate, a one-part sealant adapted for an industrial scale production which is excellent in both the shelf stability and the curing rate has not been so far developed.

In view of such situation, an object of the present invention is to provide a one-part, room temperature moisture curable resin composition which exhibits good shelf stability and fast curing rate once taken out of the container, and which may further exhibit flexibility; a one-part, room temperature moisture curable resin composition which exhibits good shelf stability and curability as well as wet surface adhesion or initial thixotropic properties; a silicon containing compound having ketimine group whose reaction with the epoxy resin during the storage is prevented by the presence of a bulky alkyl group near the ketimine group and which exhibits good shelf stability and curability, and its production method; a one-part, room temperature moisture curable resin composition containing said silicon containing compound adapted as a latent curing agent which exhibits good shelf stability and short curing period once taken out of the container; and a novel method of ketimine synthesis.

SUMMARY OF THE INVENTION

In order to solve the problems as described above, the present invention provides a one-part, room temperature moisture curable resin composition comprising a ketimine prepared by reacting a ketone having a substituent at α position and a polyamine having at least two amino groups within its molecule wherein α position is methylene; and a main polymer which is an epoxy resin and/or a modified silicone having at least two hydrolyzable alkoxysilyl groups in its molecule.

The ketone is preferably a compound represented by the following formula (1):

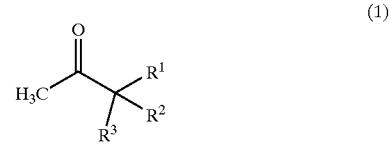

wherein $R^1$ is a member selected from the group consisting of alkyl groups containing 1 to 6 carbon atoms, $R^2$ is methyl group or ethyl group, and $R^3$ is hydrogen atom, methyl group, or ethyl group; and the polyamine is a compound represented by the following formula (2):

wherein $R^4$ is an organic group (which may be a group containing O, S or N), and n is an integer of at least 2.

The polyamine is most preferably norbornane diamine, 1,3-bisaminomethylcyclohexane, metaxylylenediamine, or polyamideamine.

The composition may contain a phosphorous ester as a curing accelerator at a content of at least 0.005 mol % of the main functional group of said main polymer.

The present invention also provides a one-part, room temperature moisture curable resin wherein the composition contains a silane coupling agent at a content of 0.1 to 20 parts by weight per 100 parts by weight of said main polymer.

The silane coupling agent is preferably trimethoxyvinylsilane or 3-glycidoxypropyltrimethoxysilane.

The present invention also provides a one-part, room temperature moisture curable resin composition wherein said composition contains a compound having a silyl ester group represented by the following formula (3) at a content of 0.05 to 10 parts by weight per 100 parts by weight of said main polymer.

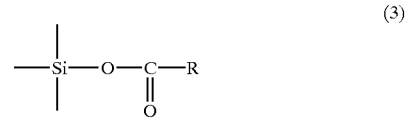

The present invention also provides a one-part, room temperature moisture curable resin composition wherein the composition contains a surface treated calcium carbonate, and the ketimine is a ketimine represented by the following formula (4):

wherein $R^9$ is an organic group including at least one of O, S, N and an aromatic ring, and/or the following formula (5):

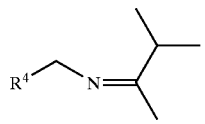

(5)

wherein $R^4$ is an organic group (which may be a group containing O, S or N).

The concentration of said ketimine in the one-part, room temperature moisture curable resin composition is up to 1.6 [mmol/g].

The epoxy resin preferably contains sulfur atom in its skeleton.

The present invention also provides, as a silicon containing compound, a silicone compound having in its backbone the structure shown in the following formula (9):

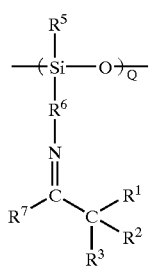

(9)

wherein $R^1$ is a member selected from the group consisting of alkyl groups containing 1 to 6 carbon atoms, $R^2$ is methyl group or ethyl group, $R^3$ is hydrogen atom, methyl group, or ethyl group, $R^5$ is an alkyl group containing 1 to 6 carbon atoms, an alkoxy group containing 1 to 6 carbon atoms, or a monovalent siloxane derivative, $R^6$ is a divalent hydrocarbon group containing or not containing nitrogen atom, $R^7$ is methyl group, ethyl group or isopropyl group, and $\lambda$ is an integer of at least 1.

The present invention also provides, as a silicon containing compound, a silicon compound comprising the structure as shown in the following formula (10):

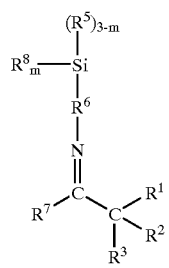

(10)

wherein $R^1$ is a member selected from the group consisting of alkyl groups containing 1 to 6 carbon atoms, $R^2$ is methyl group or ethyl group, $R^3$ is hydrogen atom, methyl group, or ethyl group, $R^5$ is an alkyl group containing 1 to 6 carbon atoms, an alkoxy group containing 1 to 6 carbon atoms, or a monovalent siloxane derivative, $R^6$ is a divalent hydrocarbon group containing or not containing nitrogen atom, $R^7$ is methyl group, ethyl group or isopropyl group, $R^8$ is a monovalent siloxane derivative, and m is an integer of 1 to 3.

Said $R^1$, said $R^2$ and said $R^7$ are preferably methyl group, and said $R^3$ is preferably hydrogen atom or methyl group.

The present invention also provides a one-part, room temperature moisture curable resin composition containing the silicon containing compound as described above; and an epoxy resin and/or a modified silicone having at least two hydrolyzable alkoxysilyl groups in its molecule. The resin composition may contain either one silicon containing compound or two or more silicon containing compounds.

The present invention also provides a method for producing said silicon containing compound characterized in that said compound is obtained by heating and stirring a compound containing an alkoxysilyl group having amino group in its molecule and a ketone represented by formula (1) as described above.

The present invention also provides a method for producing a silicone compound having epoxy group, a ketimine group, and an alkoxysilyl group in its molecule characterized in that said compound is produced by heating and stirring an alkoxysilane having epoxy group in its molecule, an alkoxysilane having amino group in its molecule, and a ketone; and the silicone compound obtained by such production method.

The ketone is preferably the one represented by said formula (1).

The present invention also provides a one-part, room temperature moisture curable resin composition comprising a silicone compound as described above; and an epoxy resin and/or a modified silicone having at least two hydrolyzable alkoxysilyl groups in it molecule.

The present invention also provides a method for producing a ketimine compound characterized in that said compound is produced by reacting a ketone with a polyamine, and then adding an isocyanate group-containing represented by the following formula:

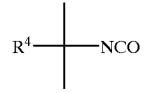

wherein $R^4$ is an organic group (which may be a group containing O, S or N).

In the production method of the ketimine compound, the ketimine is preferably synthesized from the ketone represented by said formula (1) and the polyamine represented by said formula (2).

The present invention also provides a method for producing a ketimine compound characterized in that said compound is produced by reacting a ketone and a polyamine, and then adding a silane coupling agent as a dehydration agent.

PREFERRED EMBODIMENTS FOR CARRYING OUT THE INVENTION

Next, the present invention is described in further detail.

The present invention provides a one-part, room temperature moisture curable resin composition which exhibits good shelf stability and quickly cures once taken out of the container, or which exhibits excellent flexibility as well as wet surface adhesion, and a silicon-containing compound which has a particular structure which prevents the compound from undergoing a reaction with the epoxy resin or the like during its storage. The present invention includes first to fourth aspects as described below.

First aspect of the present invention is a one-part, room temperature moisture curable resin composition which comprises a ketimine prepared by reacting a ketone having a substituent at α position and a polyamine having at least two amino groups within its molecule wherein α position is methylene; and an epoxy resin and/or a modified silicone having hydrolyzable alkoxysilyl groups within its molecule; and which may further comprise particular curing agent, silane coupling agent, a compound containing silyl ester group, or surface-treated calcium carbonate. The resin composition has the properties as described above.

Second aspect of the present invention is directed to a silicon containing compound of a particular type; its production process; and a one-part, room temperature moisture curable resin composition which comprises such silicon containing compound, and an epoxy resin and/or a modified silicone having hydrolyzable alkoxysilyl groups within its molecule. The resin composition has the properties as described above.

Third aspect of the present invention is directed to a method for producing a silicone compound having a ketimine group, epoxy group, and an alkoxysilyl group in its molecule from an alkoxysilyl group-containing compound having epoxy group and amino group in its molecule and a ketone; and a one-part, room temperature moisture curable resin composition which comprises the silicone compound produced by such production method and an epoxy resin and/or a modified silicone having hydrolyzable alkoxysilyl groups within its molecule.

Fourth aspect of the present invention is a novel method of ketimine synthesis.

Next, the ketone having a substituent at α position and the compound having at least two amino groups within its molecule wherein α position is methylene which are used as starting materials for producing the ketimine compound used in the first aspect of the present invention are described.

The ketone having a substituent at α position used in the present invention is a ketone having a substituent at α position counted from the carbonyl group, and exemplary such ketones include methyl t-butyl ketone, diisopropyl ketone, methyl isopropyl ketone and the like as well as propiophenone, benzophenone and the like. Among such ketones, the preferred are the compounds represented by formula (1) as mentioned above including methyl isopropyl ketone and methyl t-butyl ketone in view of the well balanced shelf stability and curablity of the composition prepared by blending the ketimine synthesized by using such ketone and an epoxy resin.

The polyamine having at least two amino groups within its molecule wherein α position is methylene used in the present invention is preferably a compounds represented by formula (2) as mentioned above. Exemplary such compounds represented by formula (2) include ethylenediamine, propylenediamine, butylenediamine, diethylenetriamine, triethylenetetramine, tetraethylenepentamine, pentaethylenehexamine, hexamethylenediamine, trimethylhexamethylenediamine, N-aminoethylpiperadine, 1,2-diaminopropane, iminobispropylamine, methyliminobispropylamine, diamines having polyether skeleton as typically exemplified by JEFFAMINE EDR-148 manufactured by Sun Technochemical Inc., aliphatic polyamines such as MPMD manufactured by DuPont Japan, isophorone diamine, 1,3-bisaminomethylcyclohexane, 1-cyclohexylamino-3-aminopropane, 3-aminomethyl-3,3,5-trimethylcyclohexylamine, diamines having norbornane skeleton as typically exemplified by NBDA manufactured by Mitsui Toatsu Chemicals K.K.; metaxylylenediamine, and polyamide amines having amino group on a terminal of the polyamide molecule. Among these, the preferred are 1,3-bisaminomethylcyclohexane, norbornane diamine, metaxylylenediamine, and polyamide amine since the composition comprising the ketimine synthesized by using such polyamine and an epoxy resin has good shelf stability as well as excellent curability.

Preferable examples of the ketimine compounds used in the present invention are ketimine compound obtained by using a combination of the polyamine as mentioned above and a ketone selected from methyl t-butyl ketone, diisopropyl ketone, methyl isopropyl ketone, propiophenone, benzophenone and the like Among such ketimine compounds, the ketimine compounds synthesized from the polyamine as mentioned above and methyl isopropyl ketone or methyl t-butyl ketone exhibit particularly good balance between the curing rate and the shelf stability.

The ketimine compounds synthesized from the ketone as mentioned above and 1,3-bisaminomethylcyclohexane, a norbornane diamine, methaxylylene diamine, or a polyamide amine also exhibit particularly good balance between the curing rate and the shelf stability, and such ketimine compounds exhibit particularly excellent curability.

Exemplary ketimine compounds include those prepared from JEFFAMINE EDR-148 which is a diamine having polyether skeleton manufactured by Sun Technochemical Inc. and methyl isopropyl ketone; those prepared from JEFFAMINE EDR-148 and methyl t-butyl ketone; those prepared from 1,3-bisaminomethylcyclohexane and methyl t-butyl ketone; those prepared from NBDA manufactured by Mitsui Toatsu Chemicals K.K. and methyl isopropyl ketone; those prepared from 1,3-bisaminomethylcyclohexane and methyl isopropyl ketone; those prepared from NBDA and methyl t-butyl ketone; those prepared from MXDA manufactured by Mitsubishi Gas Chemical Company, Inc. and methyl isopropyl ketone; those prepared from MXDA manufactured by Mitsubishi Gas Chemical Company, Inc. and methyl t-butyl ketone; those prepared from X2000 manufactured by SANWA CHEMICAL PRODUCT LTD. and methyl isopropyl ketone; those prepared from X2000 manufactured by SANWA CHEMICAL PRODUCT LTD. and methyl t-butyl ketone; and the like.

Among these, those prepared from NBDA manufactured by Mitsui Toatsu Chemicals K.K. and methyl isopropyl ketone; those prepared from NBDA and methyl t-butyl ketone; and those prepared from 1,3-bisaminomethylcyclohexane and methyl isopropyl ketone exhibit excellent curability.

Those prepared from X2000 and methyl isopropyl ketone; those prepared from X2000 and methyl t-butyl ketone exhibit excellent wet surface adhesion.

The ketimine compound prepared by reacting a ketone having a substituent at α position and a polyamine having at least two amino groups within its molecule wherein α position is methylene has a bulky group near the double bond of the ketimine group, and therefore, the compound fulfills contradictory requirements of fast curing rate and shelf stability. When the ketimine compound is synthesized by using a universal ketone commonly used in the prior art such as methyl isobutyl ketone (MIBK) or methyl ethyl ketone (MEK) which has no substituent at the α position, nitrogen of the ketimine is exposed, and the ketimine compound exhibits strong basicity. When such ketimine compound is blended with an epoxy resin, the resulting composition suffers from gelation and the like to detract from shelf stability. In contrast, in the ketimine compound prepared by using methyl isopropyl ketone, methyl t-butyl ketone, or the like which has a substituent at the α position for the starting material, nitrogen of the ketimine is protected by the substituent, and such steric hindrance strongly weaken the basicity of the compound. As a consequence, the composition prepared by blending the ketimine compound with an epoxy resin is not influenced by the ketimine compound, and the composition remains stable.

In the meanwhile, when the epoxy resin composition containing such ketimine compound is taken out into the air, moisture, namely, water molecules of small size readily attack the nitrogen of the ketimine without being hindered by the substrate, and hydrolysis is readily promoted. Therefore, the epoxy resin composition cures in a short period.

The ketimine compound used in the present invention is produced by heating the ketone and the polyamine as mentioned above under reflux in the absence of a solvent or in the presence of a solvent such as benzene, toluene, xylene or the like and removing the released water by azeotropic distillation.

The resin composition of the present invention contains an epoxy resin and/or a modified silicone having at least two hydrolyzable alkoxysilyl groups as its main polymer, and the amount of the ketimine compound added to such resin composition in terms of the equivalent ratio of (imino group of the ketimine compound)/(main reaction group of the main polymer) is in the range of 0.01 to 1, and preferably 0.1 to 0.5. The amount outside such range results in poor curability.

The term "main reaction group of the main polymer" used herein designates epoxy group in the case of an epoxy resin, and a hydrolyzable alkoxysilyl group in the case of a modified silicone.

The concentration of the ketimine group added in the resin composition of the present invention is preferably up to 1.6 (mmol/g), and more preferably in the range of 0.2 to 1.5 (mmol/g). The concentration in such range results in improved curing properties as well as storage stability.

The epoxy resin which is one main polymer used in the present invention is not limited to any particular type as long as the epoxy resin is a polyepoxy compound which has at least two epoxy groups in one molecule.

Exemplary such epoxy resins include bisphenol A-glycidyl ether epoxy resins, glycerin-glycidyl ether epoxy resins, polyalkylene oxide-glycidyl ether epoxy resins, phenol novolak-glycidyl ether epoxy resins, dimeric acid-glycidyl ether epoxy resins, bisphenol F-glycidyl ether epoxy resins, and epoxy resins including sulfur atoms in its skeleton as typically exemplified by Flep 10 manufactured by Toray Thiokol K.K. Among these, a bisphenol A-glycidyl ether epoxy resin is preferable as a universal epoxy resin, and an epoxy resin including sulfur atoms in its skeleton is preferable since the resulting resin composition of the present invention exhibits excellent wet surface adhesion.

The epoxy resin including sulfur atom in its skeleton used in the present invention is an epoxy resin which has sulfur atoms in its backbone. Exemplary such epoxy resin includes Flep series manufactured by Toray Thiokol K.K.

The modified silicone which is another main polymer used in the present invention is, for example, a silicone resin having a functional group such as amino group, phenyl group or alkoxy group introduced therein. The resin which is preferable for use is a silicone resin which has bonded thereto at least one alkoxy group having a hydrocarbon group containing 1 to 6 carbon atoms, and which has on its terminal a hydrolyzable silicon functional group including silicon atom which may have a hydrocarbon group containing 1 to 12 carbon atoms bonded thereto.

Exemplary such modified silicones include modified silicones having a dimethoxysilyl group or the like in its terminal such as poly(methyldimethoxysilyl) ethyl ether). The modified silicone may be used alone or in combination of two or more.

Use of such modified silicone is important for imparting flexibility with the cured product of the epoxy resin composition. The modified silicone also contributes for the improvement of the shelf stability of the epoxy resin composition.

The modified silicone and the epoxy resin may be used at any ratio. When the modified silicone is used with no epoxy resin, the resulting composition will exhibit particularly improved shelf stability. When the content of the modified silicone is in excess of 300 parts by weight, the product will exhibit poor adhesion.

Conventional one-part sealants containing a modified silicone have used a tin compound for the curing catalyst, and a dehydrating agent such as vinylsilane had to be blended in such sealants to thereby remove the moisture of a minute amount in the system and maintain the shelf stability since the tin compound is highly reactive and sensitive to moisture. However, use of the ketimine compound with severe steric hindrance as described above for the latent catalyst enabled to realize excellent shelf stability as well as high curing rate of the resin composition in the absence of vinylsilane or other dehydrating agent.

The one-part, room temperature moisture curable resin composition of the present invention can be prepared by mixing the main polymer and the ketimine compound as described above in nitrogen atmosphere, and in optional presence of a curing accelerator.

Use of a phosphorous ester for the curing accelerator is most effective since phosphorous esters do not induce unfavorable effects such as viscosity increase in the epoxy resin composition during its storage.

Exemplary phosphorous esters which may be used in the present invention include triphenyl phosphite, tris (nonylphenyl) phosphite, triethyl phosphite, tributyl phosphite, tris(2-ethylhexyl) phosphite, tridecyl phosphite, tris (tridecyl) phosphite, diphenylmono (2-ethylhexyl) phosphite, diphenyl-monodecyl phosphite, diphenylmono (tridecyl) phosphite, tetraphenyl dipropylene glycol diphosphite, tetraphenyl-tetra (tridecyl) pentaerythritol tetraphosphite, trilauryl trithiophosphite, bis(tridecyl) pentaerythritol diphosphite, bis(nonylphenyl) pentaerythritol diphosphite, tristearyl phosphite, distearyl pentaerythritol diphosphite, tris(2,4-di-t-butylphenyl) phosphite, hydrogenated bisphenol A-pentaerythritol phosphite polymer, and other triesters. The di- and mono-esters prepared by partial hydrolysis of such triester are also examples of the phosphorous esters. Among these tetraphenyltetra (tridecyl) pentaerythritol tetraphosphite, bis(tridecyl)pentaerythritol diphosphite, bis(nonylphenyl) pentaerythritol diphosphite, distearyl pentaerythritol diphosphite, hydrogenated bisphenol A-pentaerythritol phosphite polymer and the like exhibit particularly high acceleration effects, and use of such phosphites are preferable.

Of these phosphites, triesters may be added in an amount of at least 0.005 mol %, and preferably 0.005 to 1.0 mol % in relation to the main functional group of the main polymer. The main functional group of the main polymer is the same as the main functional group of the main polymer as described above. When di- or monoester prepared by partial hydrolysis of the triester is used, such di- or monoester may be added in an amount of 0.005 to 50 mol %, and preferably 0.005 to 10 mol % in relation to the main functional group of the main polymer. The di- or monoester added in an amount less than 0.005 mol % is not effective as an accelerator, and the diester added in an amount more than 50 mol % will adversely affect the shelf stability.

It should be noted that the one-part, room temperature moisture curable resin composition of the present invention may contain an accelerator other than phosphites.

The one-part, room temperature moisture curable resin composition may further contain a silane coupling agent. Addition of a particular amount of silane coupling agent enables production of a one-part, room temperature moisture curable resin composition which exhibits well balanced shelf stability and curing rate simultaneously with favorable wet surface adhesion.

The silane coupling agent used in the present invention is not limited to any particular type, and any silane coupling agent generally blended in an epoxy resin can be used. Exemplary such silane coupling agents include, chloropropyltrimethoxy silane, trimethoxyvinylsilane, vinyltriethoxysilane, vinyltris (2-methoxyethoxy) silane, γ-methacryloxypropyltrimethoxysilane, and 3-glycidoxypropyl-trimethoxysilane. among these preferred are trimethoxyvinylsilane and 3-glycidoxypropyltrimethoxysilane in view of their high effectivity in improving the wet surface adhesion and universality.

The silane coupling agent is added in an amount of 0.1 to 20 parts by weight, and preferably 0.5 to 10 parts by weight per 100 parts by weight of the main polymer. Use in such amount is preferable since the wet surface adhered by using the resulting resin composition exhibits high shear stress upon breakage and matrix damage of approximately 100%.

The one-part, room temperature moisture curable resin composition of the present invention may contain a compound having a silyl ester group represented by the following formula (3). Presence of such compound having a silyl ester group in the one-part, room temperature moisture curable resin composition in a particular amount contributes for the shortening of the curing time without detracting from the shelf stability of the resin composition.

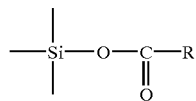
(3)

In the formula, R represents hydrogen atom or a hydrocarbon group containing 1 to 20 carbon atoms. Exemplary hydrocarbon groups include straight-chain hydrocarbon groups such as methyl group, ethyl group, vinyl group, propyl group, octyl group, lauryl group, palmityl group, stearyl group, allyl group, and eicosyl group; branched hydrocarbon groups such as isopropyl group and isobutyl group; aliphatic hydrocarbon groups such as hexamethyl group; and aromatic groups such as phenyl group and benzyl group.

R is most preferably a hydrocarbon group containing 1 to 17 carbon atoms since the resulting products exhibits good shelf stability and accelerated curing reaction. When R is hydrogen atom, the shelf stability is not so favorable, and when R is a hydrocarbon group containing 18 or more carbon atoms, the curing reaction is not so much accelerated.

The compound having a silyl ester group which may be used in the present invention is not particularly limited as long as its silyl ester group is represented by formula (3) as described above. The compound may have the silyl ester group in the intermediate portion or at the terminal of its backbone, or in its side chain, and the compound may have either one, or two or more silyl ester groups. When the compound has two or more silyl ester groups represented by formula (3), the silyl ester groups may comprise either the same type or different types of silyl ester groups. The backbone of the compound having the silyl ester group mainly comprises Si—O bond, and the backbone may comprise either single type or different types. When the silyl ester group represented by formula (3) is present in the backbone, the Si in the silyl ester group is the Si in the backbone.

Examples of the compounds having the silyl ester group include the compounds represented by the following formulae.

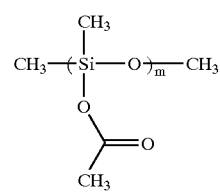
(6)

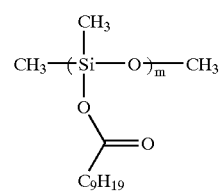
(7)

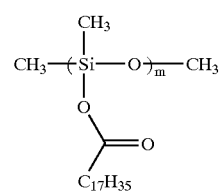
(8)

In formulae (6) to (8), the number of recurrent units m of the silyl ester group is an integer of at least 1.

The compound having the silyl ester group as described above may be prepared by a process wherein a polyhydrogen siloxane having Si—H group such as poly(methyl hydrogen) siloxane is reacted with a straight-chain saturated fatty acid such as formic acid and stearic acid, unsaturated fatty acid such as caproleic acid, or a carboxylic acid such as an aromatic carboxylic acid such as benzoic acid, or an alicyclic carboxylic acid such as naphtoic acid, or alternatively, a copolymer of the polyhydrogen siloxane as described above and an alkene is reacted with the carboxylic acid as described above for dehydration condensation by using Pt, Ru or other transition metal of Group VIII in the form of a simple substance or a metal chloride as a catalyst.

The one-part, room temperature moisture curable resin composition of the present invention may preferably contain the compound having the silyl ester group as described above in an amount of 0.05 to 10 parts by weight per 100 parts by weight of the main polymer as described above since the curing time can be reduced without detracting from the shelf stability when the content is within such range. A content at 0.1 to 8.0 parts by weight is most preferable.

The one-part, room temperature moisture curable resin composition of the present invention may also contain calcium carbonate at a content which does not adversely affect the object of the present invention. In particular, addition of a surface-treated calcium carbonate enables adjustment of the viscosity as well as realization of good initial thixotropic properties and shelf stability.

Examples of such calcium carbonates which may be used include conventional known surface-treated calcium carbonates surface treated with a fatty acid, a resin acid or a fatty acid ester. Exemplary preferably calcium carbonates surface treated with a fatty acid include Calfine 200 (manufactured by Maruo Calcium K.K.), and Whiton 305 (ground calcium carbonate, manufactured by Shiraishi Calcium K.K.); and exemplary preferably calcium carbonates surface treated with a fatty acid ester include Sealet 200 (manufactured by Maruo Calcium K.K.).

The one-part, room temperature moisture curable resin composition wherein a surface-treated calcium carbonate is used for the calcium carbonate exhibits particularly improved thixotropic properties and shelf stability when the ketimine used is a compound represented by the following formula (4) or (5):

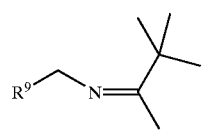
(4)

wherein $R^9$ is an organic group which has at least one of O, S, N and an aromatic ring;

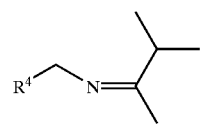
(5)

wherein $R^4$ is an organic group (which may be a group containing O, S or N).

The surface-treated calcium carbonate has low surface polarity. Therefore, use of a ketimine with low polarity will invite wetting and the resulting product will suffer from poor thixotropic properties. Use of a ketimine with a relatively high polarity is preferable for the purpose of preventing such wetting.

In the ketimine represented by the formula (5), the substituents near the imine moiety are methyl group and isopropyl group, which are too small to reduce the polarity of the imine portion with high polarity. Therefore, good thixotropic properties and the shelf stability can be maintained without being influenced by the ketimine skeleton ($R^4$).

On the other hand, in the ketimine represented by the formula (4), polarity of the imine moiety is reduced by the methyl group and t-butyl group. Therefore, the ketimine skeleton ($R^9$) should have a high polarity.

Examples of such ketimine of relatively high polarity include ketimines synthesized from a diamine having polyether skeleton as typically exemplified by JEFFAMINE EDR-148 manufactured by Sun Technochemical Inc. or a diamine having xylylene skeleton as typically exemplified by MXDA manufactured by Mitsubishi Gas Chemical Company, Inc. and methyl isopropyl ketone or methyl t-butyl ketone; and ketimines synthesized from a diamine having norbornane skeleton as typically exemplified by NBDA manufactured by Mitsui Toatsu Chemicals K.K. or a diamine having cyclohexane skeleton as typically exemplified by 1,3-BAC manufactured by Mitsubishi Gas Chemical Company, Inc. and methyl isopropyl ketone or methyl t-butyl ketone.

The calcium carbonate is added preferably in an amount of 30 to 300 parts by weight, and more preferably, 80 to 200 parts by weight per 100 parts by weight of the main polymer. At a content of less than 30 parts by weight, the resulting product will not have adequate initial thixotropic properties and handling convenience. At a content in excess of 300 parts by weight, the resulting product will exhibit viscosity increase to detract from handling convenience.

Next, the silicon containing compounds having ketimine group; its production process; and the one-part, room temperature moisture curable resin compositions which comprises such silicon containing compound according to the second aspect of the present invention are described.

The silicon containing compounds having ketimine group of the present invention is the compounds represented by the following formula (9) or (10).

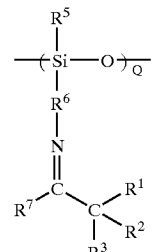
(9)

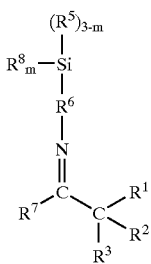
(10)

In formula (9), $R^5$ represents an alkyl group containing 1 to 6 carbon atoms, an alkoxy group containing 1 to 6 carbon atoms, or a monovalent siloxane derivative. Exemplary alkyl groups containing 1 to 6 carbon atoms include, methyl group, ethyl group, and propyl group; exemplary alkoxy groups containing 1 to 6 carbon atoms include methoxy group, ethoxy group and propoxy group; and exemplary monovalent siloxane derivatives include silyloxy group. Among these, the preferred are methyl group, methoxy group and ethoxy group.

$R^6$ represents a divalent hydrocarbon group containing nitrogen atom, or a divalent hydrocarbon group containing no nitrogen atom. Such hydrocarbon groups are preferably those containing 1 to 6 carbon atoms. Exemplary divalent hydrocarbon groups containing no nitrogen atom include methylene group ethylene group, and propylene group and exemplary divalent hydrocarbon groups containing nitrogen atom include those mentioned above for the divalent hydrocarbon group containing no nitrogen atom which also contain imino group. Among such groups, the preferred are propyl group and ethylpropylamino group.

$R^7$ represents methyl group, ethyl group or isopropyl group.

$R^1$ represents a alkyl group containing 1 to 6 carbon atoms such as methyl group, ethyl group or propyl groups, and $R^1$ is the same as the groups defined by $R^1$ in the first aspect of the present invention.

$R^2$ represents methyl group or ethyl group, and $R^2$ is the same as the groups defined by $R^2$ in the first aspect of the present invention.

$R^3$ represents hydrogen atom, methyl group or ethyl group, and $R^3$ is the same as the groups defined by $R^3$ in the first aspect of the present invention.

Q represents an integer of at least 1, and preferably, an integer of 1 to 50.

In the silicone compound of the present invention having the structure represented by formula (9) in the backbone, the siloxane bond constituting the backbone may have in its terminal hydrogen atom; an alkyl group containing 1 to 6 carbon atoms such as methyl group, ethyl group, or propyl group; an alkoxy group containing 1 to 6 carbon atoms such as methyoxy group, ethoxy group, or propoxy group; or a monovalent siloxane derivative such as silyloxy group.

In formula (10), $R^1$ to $R^3$ and $R^5$ to $R^7$ are the same as $R^1$ to $R^3$ and $R^5$ to $R^7$ defined for formula (9). $R^8$ is a monovalent siloxane derivative. An example of such monovalent siloxane derivative is silyloxy group. Among these, the preferred are methyl group, methoxy group and ethoxy group. m is an integer of 1 to 3.

Of the silicon containing compounds having ketimine group represented by the formula (9) or (10), the silicon containing compounds wherein $R^1$, $R^2$ and $R^7$ are methyl group and $R^3$ is hydrogen atom or methyl group are preferable in view of the well-balanced shelf stability and curability of the one-part, room temperature moisture curable resin composition prepared by blending such compound with an epoxy resin.

The silicon containing compound having ketimine group represented by the formula (9) or (10) is prepared by mixing a silicon compound having amino group represented by formula (11) as shown below with a ketone represented by formula (12) as shown below; or alternatively, by mixing a silicon compound having no amino group as described below in addition to the silicon compound having amino group represented by formula (11), and stirring the mixture under heating. The reaction temperature is preferably 50 to 150° C., and the reaction time is preferably 2 to 24 hours.

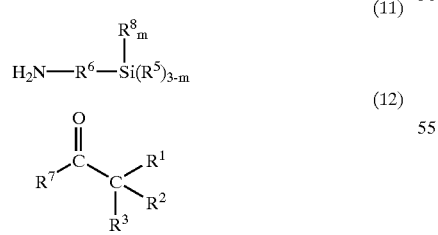

In formula (11), $R^5$, $R^6$ and m are the same as the $R^5$, $R^6$ and m defined for formula (9). $R^5$ may be the same or different with each other.

In formula (12), $R^1$, $R^2$, $R^3$ and $R^7$ are the same as the $R^1$, $R^2$, $R^3$ and $R^7$ defined for formula (9).

More illustratively, when equimolar amounts of the silicon compound having amino group represented by formula (11) and the ketone represented by formula (12) are stirred under heating, the silicon compound having ketimine group of the present invention represented by formula (10) is formed through dehydration reaction.

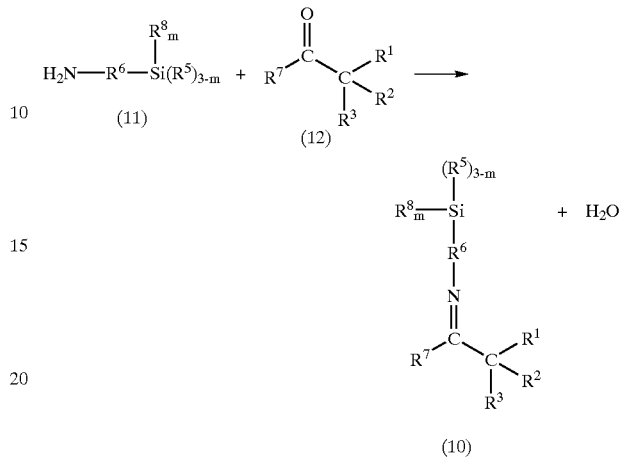

Next, the released water hydrolyzes the alkoxysilyl group, and the hydrolyzed alkoxysilyl group polymerizes to form the silicone composition of the present invention having the structure shown by formula (9) as its backbone skeleton.

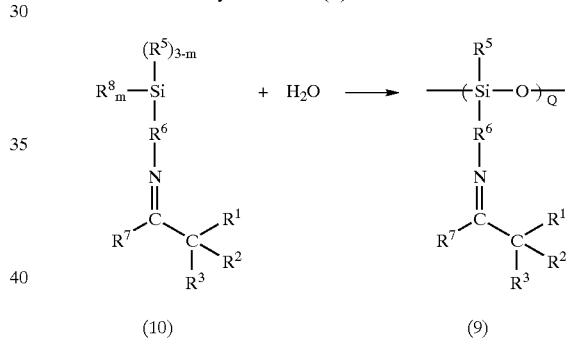

The silicon compound represented by formula (11) may comprise any silicon compound having amino group in its molecule, and use of a silicon compound having both amino group and alkoxysilyl group is preferable. Exemplary such silicon compounds include the compound represented by formulae (13) to (20).

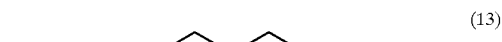

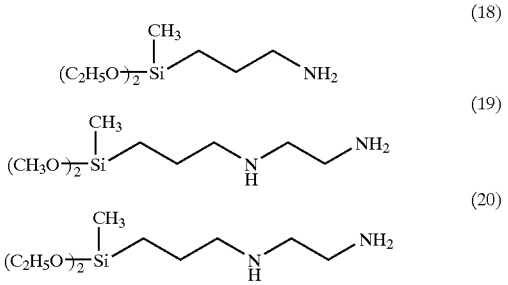

Among these, the silicon compounds represented by formulae (13) to (16) are universal silane coupling agents which are favorably used, and use of such silicon compounds is preferable.

In the reaction between the silicon compound represented by formula (11) and the ketone represented by formula (12), an alkoxysilane having no amino group may also be added to the reaction system for simultaneous reaction. Although such alkoxysilane having no amino group may be added in any amount, addition in a molar amount of up to 5 times, and preferably up to 2 times the amount of the silicon compound represented by formula (11) is preferred in view of the physical properties of the cured product.

Any silicon compound having an alkoxysilyl group may be used for the alkoxysilane having no amino group. Exemplary silicon compounds include the compounds represented by the following formula.

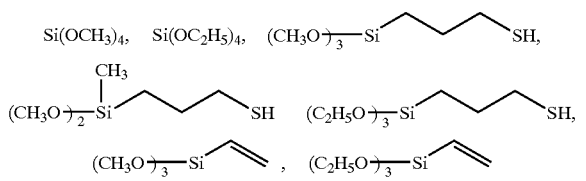

Examples of the ketone represented by formula (12) include methyl isopropyl ketone, methyl t-butyl ketone, and diisopropyl ketone. Among these, methyl isopropyl ketone and methyl t-butyl ketone are most preferable since they are easily converted into ketimine in the reaction with the silicon compound represented by formula (11) and the thus formed ketimine group is easily hydrolyzed, and the resulting product has excellent curability and shelf stability.

Such ketone reacts with the silicon compound represented by formula (11), and imparts bulkiness to the ketimine group formed by the reaction near its nitrogen atom, and the reaction of the nitrogen atom of the ketimine group and the epoxy compound is prevented by the steric hindrance effects of the bulky group.

Therefore, when the silicon containing compound having such molecular structure is stored after mixing with the epoxy resin, the resulting product exhibits high curability once taken out of the container as well as excellent shelf stability.

In the sealants wherein a modified silicone is blended, use of a dehydrating agent such as vinylsilane has been required for the purpose of maintaining the shelf stability as described for the first aspect of the present invention. Use of the silicon containing compound as described above for the latent catalyst enables the production of a resin composition which exhibits good shelf stability as well as high curing rate without blending the dehydrating agent such as vinylsilane.

In the conventional reaction for synthesizing an organosilicon compound having ketimine group, polymerization of the alkoxysilyl group induced by the water released upon ketimine formation has been suppressed by using a dehydrating agent. In contrast, in the above-described method for producing the silicon containing compound of the present invention represented by formulae (9) and (10), the water generated is utilized in the hydrolysis of the alkoxysilane moiety of the molecule. As a consequence, in the production of the silicon containing compound according to the present invention, the resulting silicon containing compound having the ketimine group does not undergo gelation, and a polyfunctional ketimine is readily produced.

Next, the one-part, room temperature moisture curable resin composition containing the silicon containing compound having the ketimine as described above and an epoxy resin and/or a modified silicone having at least two hydrolyzable alkoxysilyl groups in its molecule (hereinafter referred to as the resin composition according to second aspect of the present invention) is described.

In the present invention, either or both of the silicone compound represented by the formula (9) and the silicon compound represented by the formula (10) may be used.

The epoxy resin used in the second aspect of the present invention is not particularly limited as long as it is an epoxy resin having at least two epoxy groups in its molecule, and an epoxy resin the same as the one used in the first aspect of the present invention may be used.

The modified silicone used in the second aspect of the present invention is not particularly limited as long as it is a silicone resin having at least two hydrolyzable alkoxysilyl groups in its molecule, and a modified silicone the same as the one used in the first aspect of the present invention may be used.

The epoxy resin and the modified silicone resin are hereinafter referred to as the main polymer. Such main polymer is the same as the main polymer described in the first aspect of the present invention. The main functional group of the main polymer is the epoxy group in the case of the epoxy resin, and the alkoxysilyl group in the case of the modified silicone. The main functional group of the main polymer is also the same as the one in the first aspect of the present invention.

The silicon containing compound according to the second aspect of the present invention may be added in the epoxy resin composition according to the second aspect of the present invention in an equivalent ratio of (imino group in the silicon containing compound): (the main functional group of the main polymer) of 0.01 to 1, and preferably, 0.1 to 0.5. Addition in an amount outside such range results in poor curability.

The resin composition according to the second aspect of the present invention can be prepared by mixing the main polymer and the silicon containing compound having ketimine group according to the second aspect of the present invention in nitrogen atmosphere, and as in the case of the first aspect of the present invention, the resin composition may be prepared by incorporating optional curing accelerator such as a phosphorous ester.

Next, the method for producing a silicone compound having epoxy group, a ketimine group, and an alkoxysilyl group in its molecule from an alkoxysilane having epoxy group in its molecule and alkoxysilane having amino group in its molecule and a ketone; and a one-part, room temperature moisture curable resin composition which comprises the silicone compound produced by such production method and an epoxy resin and/or a modified silicone having hydrolyzable alkoxysilyl groups within its molecule according to the third aspect of the present invention are described.

In the method for producing a silicone compound according to the third aspect of the present invention, an alkoxysilane having epoxy group in its molecule, an alkoxysilane having amino group in its molecule, and a ketone is mixed and the mixture is stirred under heating. The ketone is added in an amount such that the ketone is present at the same equivalent with or in excess of the amino group, and more preferably, in an amount of at least 1.2 equivalents of the amino group. The reaction temperature is preferably 50 to 150° C., and more preferably, 70 to 110° C. The reaction time is preferably 2 to 24 hours, and more preferably, 2 to 5 hours. The excessive ketone and the methanol generated are then removed under reduced pressure to obtain the product of interest.

It should be noted that the alkoxysilane having the epoxy group and the alkoxysilane having the amino group, are the alkoxysilanes which may be used for silane coupling agents.

The reaction which is estimated to take place in the silicone compound production method as described above is as described below. When equimolar amounts of the silicon compound having amino group and the ketone are mixed and stirred with heating, an alkoxysilane having ketimine group and hydrolyzable alkoxysilyl group is first generated by dehydration reaction. The water released then hydrolyzes the alkoxysilyl group of the alkoxysilane having ketimine group and hydrolyzable alkoxysilyl group, and the alkoxysilyl group of the alkoxysilane having epoxy group, and the hydrolyzed alkoxysilyl groups undergo polymerization.

As a consequence, a silicone compound having epoxy group, ketimine group, and an alkoxysilyl group in the same molecule is produced in the silicone compound production method according to the third aspect of the invention.

The alkoxysilane having epoxy group used in the silicone compound production method according to the third aspect of the invention is a compound having epoxy group and a hydrolyzable alkoxysilyl group at the terminals of the molecule. The backbone of the compound is an organic group mainly comprising a hydrocarbon groups such as methylene group or ethylene group and also includes a group containing O, S, or N.

The hydrolyzable alkoxysilyl group present at the terminal of the molecule is a reactive silicon group wherein an alkoxy group such as methoxy group or ethoxy group is bonded to the silicon atom, and which may also have hydrogen atom, or an alkyl group such as methyl group or ethyl group bonded thereto. The alkoxy group is preferably methoxy group in view of its mild hydrolyzability and handling convenience.

An exemplary alkokysilane is the one represented by the following formula.

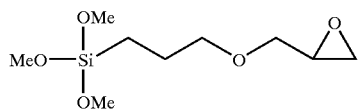

The alkoxysilane having amino group in its molecule used in the production of the silicone compound according to the third aspect of the present invention is a compound which has amino group and a hydrolyzable alkoxysilyl group in the terminals of the molecule. The backbone may comprise an organic group which may contain N, such as an alkylene group such as an ethylene group or a propylene group. Exemplary such alkoxysilanes include those represented by formulae (13) to (20) mentioned for the second aspect of the present invention.

An exemplary silicone compound produced by the production method of the silicone compound according to the third aspect of the present invention is the one represented by the following formula (21).

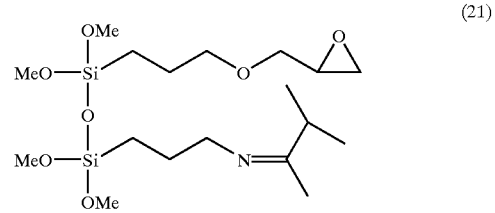

Epoxy group and amino group readily undergo reaction with each other, and copresence of such functional groups in unreacted states in the same reaction system has been impossible. In view of such situation, an attempt has been made wherein the amino group has been converted into ketimine for copresence with the epoxy group. The epoxy resin composition containing such compound, however, suffered from poor shelf stability, and there has been so far no compound wherein both functional groups are included at the same time.

In the silicone compound according to the third aspect of the present invention, epoxy group, ketimine group, and alkoxysilyl group are copresent in the same molecule in a stable condition. Therefore, when such silicone compound is used for the curing agents, the resulting resin composition exhibits fast curing and good shelf stability, and such resin composition is favorable for use as an adhesive.

In particular, the silicone compound obtained by using the ketone of severe steric hindrance as shown in the formula (1) for the material of ketimine group synthesis is preferable for use as a curing agent, and when used as a curing agent, it realizes remarkably favorable balance between the shelf stability and the curability.

Next, the one-part curable resin composition containing a silicone compound according to third aspect of the present invention is described.

This resin composition is a one-part, room temperature moisture curable resin composition containing epoxy resin and/or a modified silicone containing at least two hydrolyzable alkoxysilyl group in the molecule; and the silicone compound as described above.

The epoxy resin or the modified silicone contained in the one-part curable resin composition containing a silicone compound according to the third aspect of the present invention may be the same as the epoxy resin and the modified silicone used in the first and second aspects of the present invention.

The silicone compound may be blended in an equivalent ratio of (imino group in the silicon compound): (the main functional group of the main polymer and the silicone compound) of 0.01 to 1, and preferably, 0.1 to 0.5. Addition in an amount outside such range results in poor curability.

The one-part curable resin composition according to the third aspect of the present invention can be prepared by mixing the epoxy resin and/or the modified silicone with the silicone compound having epoxy group, ketimine group, and alkoxysilyl group in the same molecule in nitrogen atmosphere.

The one-part curable resin composition containing a silicone compound as a latent catalyst according to the third aspect of the invention exhibits good shelf stability, and in particular, the composition having epoxy resin and a modified silicone blended thereto exhibits improved adhesion compared to conventional one-part curable resin composition of modified silicone type which suffered from poor adhesion to concrete and mortar. Since the resin composition has a modified silicone blended therein, the resin composition has a flexibility higher than the resin composition solely containing the epoxy resin. In addition, in the one-part sealant employing amodified silicone, a dehydrating agent such as vinylsilane has been necessary for the purpose of maintaining the shelf stability as described for the first aspect of the present invention. Use of the silicone compound as described above for the latent catalyst enables the production of a resin composition which exhibits good shelf stability as well as high curing rate without blending the dehydrating agent such as vinylsilane.

In addition to the critical compounds as described above, the resin compositions according to the first to the third aspects of the present invention may have blended therewith a filler, a plasticizer, a thixotropic agent, a pigment, a dye, an anti-aging agent, an antioxidant, an antistatic agent, a flame retardant, a tackifier, a dispersing agent, a solvent, and the like in an amount that does not hinder the objects of the present invention, Exemplary fillers which may be used in the present invention include organic and inorganic fillers of various forms such as fumed silica, calcined silica, precipitated silica, powdered silica, and molten silica; diatomaceous earth; iron oxide, zinc oxide, titanium oxide, barium oxide, and magnesium oxide; calcium carbonate, magnesium carbonate and zinc carbonate; talc clay, kaolin clay, and calcined clay; carbon black; and any of the foregoing treated by a fatty acid, a resin acid, a fatty acid ester and the like.

The filler may be blended in all of the first to the third aspect of the present invention in an amount of 30 to 300 parts by weight, and preferably 80 to 200 parts by weight per 100 parts by weight of the main polymer in consideration of the physical properties of the cured product produced after the curing of the resin composition of the present invention.

Exemplary plasticizers which may be used in the present invention include dioctyl phthalate (DOP) dibutyl phthalate (DBP); dioctyl adipate isodecyl malonate; diethylene glycol dibenzoate, pentaerythritol ester; butyl oleate, methyl acetylricinoleate; tricresyl phosphate and trioctyl phosphate; polypropylene glycol adipate and polybutylene glycol adipate; and the like. These plasticizers may be used alone or in combination of two or more.

The plasticizer may be blended in all of the first to the third aspect of the present invention in an amount of up to 100 parts by weight, and preferably up to 50 parts by weight per 100 parts by weight of the main polymer in consideration of the physical properties of the cured product and handling convenience.

Exemplary thixotropic agents which may be used in the present invention include Aerosil (manufactured by Nippon Aerosil K.K.) and Disparon (manufactured by Kusumoto Kasei K.K.), and exemplary antistatic agents include common antistatic agents such as quaternary ammonium salts, polyglycols, ethylene oxide derivatives and other hydrophilic agents.

Both inorganic and organic pigments may be used in the present invention. Exemplary inorganic pigments include titanium dioxide, zinc oxide, ultramarine, red iron oxide, lithopone, lead, cadmium, iron, cobalt, aluminum, hydrochloride, sulfate.

Exemplary organic pigments which may be used in the present invention include azo pigments and copper phthalocyanine pigments.

Exemplary anti-aging agents which may be used in the present invention include hindered phenol-based compounds.

Exemplary antioxidants which may be used in the present invention include butylated hydroxytoluene (BHT) and butylated hydroxy anisole (BHA).

Exemplary flame retardants which may be used in the present invention include chloroalkyl phosphate, dimethyl methylphosphonate, bromine-phosphorus compounds, ammonium polyphosphate, neopentylbromide polyether, and brominated polyether.

Exemplary tackifier which may be used in the present invention include terpene resin, phenol resin, terpene-phenol resin, rosin resin, and xylene resin.

The method for producing the one-part, room temperature moisture curable resin composition according to first to third aspects of the present invention is not particularly limited. However, the epoxy resin composition is preferably produced by fully kneading the components as described above under reduced pressure, and in particular, in nitrogen atmosphere of reduced pressure by using an agitator such as a mixer to thereby uniformly disperse the components.

Next, the method of ketimine synthesis according to the fourth aspect of the present invention is described.

A ketimine compound is produced by a dehydration reaction from an amine and a ketone. This reaction, however, is an equilibrium reaction, and promotion of the reaction in the final stage and completion of the reaction has been difficult. Therefore, the amine which failed to react remained, and the one-part moisture curable resin composition which employed the ketimine compound containing the unreacted amine for the latent curing agent suffered from the drawback of poor shelf stability.

The method of ketimine synthesis according to fourth aspect of the present invention is a production method which has obviated such problem.

The method of ketimine synthesis according to fourth aspect of the present invention include two exemplary processes. The first process is the process of ketimine compound synthesis characterized in that a ketone and a polyamine are reacted, and then, an isocyanate group-containing compound represented by the following formula:

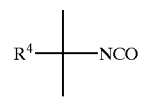

wherein $R^4$ is an organic group (including the group having O, S and N) is added.

In this first process, a compound having an isocyanate group with severe steric hindrance is added to the reaction system in the final step so that the amine which failed to react remaining after the reaction of the ketone with the polyamine is capped by the isocyanate compound. As a consequence, the resin compositions having blended therein the ketimine compound produced by this production process exhibit good shelf stability and curability.

Preferable examples of the isocyanate group-containing compound represented by the above-mentioned formula employed in the first process include THXDI, TMI, Scisen and the like manufacture by Mitsui Scitech K.K.

The isocyanate group-containing compound is preferably blended in an amount such that equivalent of the isocyanate group will be the same as the unreacted amino group.

The second process is the process of ketimine compound synthesis characterized in that a ketone and a polyamine are reacted, and then, a silane coupling agent is added as a dehydrating agent. More illustratively, in the equilibrium reaction wherein the polyamine and the ketone are reacted to produce the ketimine, the water generated in the dehydration reaction between the polyamine and the ketone is dehydrated and removed by the silane coupling agent to thereby shift the equilibrium to the direction of ketimine synthesis and complete the reaction.

The silane coupling agent used in this second process may be the same as the one used for the first aspect of the present invention.

The silane coupling agent may be blended at an amount of 1 to 3 times the molar amount of the unreacted amine. The silane coupling agent of the amount within such range is capable of effectively dehydrating and removing the water in the system.

The first and the second processes as described above may be carried out at once. That is, the ketone and the polyamine may be reacted to induce the dehydration reaction, and the silane coupling agent may be added as a dehydrating agent for the removal of the water in the reaction system to thereby shift the equilibrium to the direction of ketimine synthesis and the reaction completion. Then, the compound having an isocyanate group with severe steric hindrance may be added to the reaction system so that the amine which failed to react remaining in the reaction system can be capped by such isocyanate compound.

In the first and the second processes as described above, the ketone and the polyamine used in the ketimine production are preferably the ketone represented by the above formula (1) with a severe steric hindrance having a substituent at the αposition and the polyamine represented by the formula (2) having at least two amino groups in its molecule wherein the axposition is methylene, respectively. The ketimine produced by the ketimine production process as described above using such ketone and such polyamine will be favorably used as a latent curing agent having excellent shelf stability and curability.

Industrial Utility Field

As evident from the above description, the one-part, room temperature moisture curable resin compositions according to first to third aspect of the present invention are compositions which exhibit good shelf stability, quick curing once taken out of the container, well balanced properties, and in some cases, flexibility, and are effective for use as adhesives for concretes, woods, metals and the like, and as sealants. The resin composition containing a ketimine synthesized from a polyamide amine, the resin composition containing an epoxy resin including sulfur atom in its skeleton, and a one-part, room temperature moisture curable resin composition containing a silane coupling agent wich are within the scope of the first aspect of the present invention exhibit not only the excellent shelf stability and curability but also excellent wet surface adhesion, and therefore, these composition can be favorably used as adhesives for a wide variety of materials such as concretes, woods and metals irrespective of whether the surface to be adhered is wet or dry. The resin composition containing surface treated calcium carbonated and a ketimine of high polarity exhibits not only the excellent shelf stability and curability but also excellent initial thixotropy properties, and therefore, such resin composition is excellent for use as an adhesive.

The silicon containing compound according to second aspect of the present invention renders excellent shelf stability and high curing rate when it is used as a latent curing agent or a latent catalyst for a one-part epoxy resin or a modified silicone. In particular, the silicon containing compound of the present invention synthesized by using a ketone with severe steric hindrance is especially useful as a latent curing agent for fast curing of a one-part epoxy resin and as a latent catalyst for a modified silicone. Therefore, the silicon containing compound of the present invention is useful as a latent curing agent of an epoxy based adhesive or a sealant in the field of civil engineering and architecture, and as a coupling agent for various adhesives.

The method for producing a silicone compound according to third aspect of the present invention is capable of readily producing a compound which has epoxy group, a ketimine group, and an alkoxysilyl group in one molecule. The resin composition containing the silicone compound according to the third aspect of the present invention as the curing agent exhibits high curing rate and excellent shelf stability, and therefore, favorable for use as an adhesive and the like.

In the method for synthesizing a ketimine according to fourth aspect of the present invention, a ketone and a polyamine used for the ketimine synthesis react with each other to enable the synthesis of a ketimine of high shelf stability at a high efficiency.

EXAMPLES

Next, the present invention is described in further detail by referring to Examples which by no means limit the scope of the present invention.

<Synthesis of Ketimine Compounds>

(Synthesis 1)

A flask was charged with 100 g of a diamine having polyether skeleton (JEFFAMINE EDR148[*1], manufactured by Sun Technochemical Inc.), 189 g of methyl isopropyl ketone (3.6 equivalents of the diamine), and 200 g of toluene, and the water produced was removed by azeotropic distillation. The reaction was allowed to take place for 20 hours to obtain ketimine compound A.

(Synthesis 2)

The procedure of the Synthesis 1 was repeated except that 220 g of methyl t-butyl ketone was used for the ketone, and ketimine compound B was obtained after 50 hours.

(Synthesis 3)

The procedure of the Synthesis 1 was repeated except that 100 g of 1,3-bisaminomethylcyclohexane (1,3-BAC, manufactured by Mitsubishi Gas Chemical Company, Inc.) was used for the amine, and 254 g of methyl isobutyl ketone was used for the ketone, and ketimine compound D was obtained after 24 hours.

(Synthesis 4)

The procedure of the Synthesis 1 was repeated except that 100 g of a diamine having PPG skeleton (JEFFAMINE D230[*3], manufactured by Sun Technochemical Inc.) was used for the amine, and 157 g of methyl isobutyl ketone was used for the ketone, and ketimine compound E was obtained after 50 hours.

(Synthesis 5)

The procedure of the Synthesis 1 was repeated except that 100 g of a diamine having norbornane skeleton (NBDA[*4], manufactured by Mitsui Toatsu Chemicals K.K.) was used for the amine, and 200 g of methyl isopropyl ketone was used for the ketone, and ketimine compound F was obtained after 20 hours.

(Synthesis 6)

The procedure of the Synthesis 1 was repeated except that 100 g of 1,3-bisaminomethylcyclohexane (1,3-BAC[*2], manufactured by Mitsubishi Gas Chemical Company, Inc.) was used for the amine, and 200 g of methyl isopropyl ketone was used for the ketone, and ketimine compound G was obtained after 20 hours.

(Synthesis 7)

The procedure of the Synthesis 1 was repeated except that 100 g of a diamine having norbornane skeleton (NBDA[*4], manufactured by Mitsui Toatsu Chemicals K.K.) was used for the amine, and 200 g of methyl isobutyl ketone was used for the ketone, and ketimine compound H was obtained after 20 hours.

(Synthesis 8)

The procedure of the Synthesis 1 was repeated except that 100 g of a diamine having norbornane skeleton (NBDA*4, manufactured by Mitsui Toatsu Chemicals K.K.) was used for the amine, and 200 g of methyl t-butyl ketone was used for the ketone, and ketimine compound I was obtained after 30 hours.

(Synthesis 9)

The procedure of the Synthesis 1 was repeated except that 100 g of methaxylylenediamine (MXDA, manufactured by Mitsubishi Gas Chemical Company, Inc.) was used for the polyamine, and 190 g of methyl isopropyl ketone was used for the ketone, and ketimine compound J was obtained after 20 hours.

(Synthesis 10)

The procedure of the Synthesis 1 was repeated except that 100 g of methaxylylenediamine (MXDA, manufactured by Mitsubishi Gas Chemical Company, Inc.) was used for the polyamine, and 216 g of methyl t-butyl ketone was used for the ketone, and ketimine compound K was obtained after 30 hours.

(Synthesis 11)

The procedure of the Synthesis 1 was repeated except that 100 g of polyamide amine (X2000, manufactured by SANWA CHEMICAL PRODUCT LTD.) was used for the polyamine, and 180 g of methyl isopropyl ketone was used for the ketone, and ketimine compound L was obtained after 20 hours.

(Synthesis 12)

The procedure of the Synthesis 1 was repeated except that 100 g of polyamide amine (X2000, manufactured by SANWA CHEMICAL PRODUCT LTD.) was used for the polyamine, and 200 g of methyl t-butyl ketone was used for the ketone, and ketimine compound M was obtained after 40 hours.

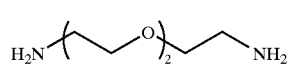

JEFFAMINE EDR148

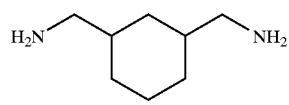

13BAC

JEFFAMINE D230

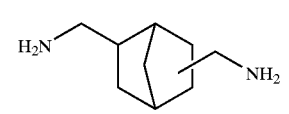

NBDA

*1
*2
*3
*4

Examples 1 to 16 and Comparative Examples 1 to 3

The components were mixed at the blend ratio as shown in Table 1 to produce the resin composition described in Examples 1 to 16 and Comparative Examples 1 to 3. The resin compositions were evaluated, and the results of the evaluation are also shown in Table 1.

TABLE 1

|  | Examples | | | | | | | | | |
|---|---|---|---|---|---|---|---|---|---|---|
|  | 1 | 2 | 3 | 4 | 5 | 6 | 7 | 8 | 9 | 10 |
| Epoxy resin | 100 | 100 | 100 | 100 | 100 | 100 | 100 | 100 | 100 | 100 |
| Calcium carbonate | 100 | 100 | 100 | 100 | 100 | 100 | 100 | 50 | 20 | 100 |
| Ketimine compound A | 40 | | | | | | | | | |
| Ketimine compound B | | 43 | 43 | 43 | 43 | 43 | | | | |
| Ketimine compound F | | | | | | | 36 | 40 | 40 | |
| Ketimine compound G | | | | | | | | | | 32 |
| Ketimine compound I | | | | | | | | | | |
| Ketimine compound D | | | | | | | | | | |
| Ketimine compound E | | | | | | | | | | |
| Ketimine compound H | | | | | | | | | | |
| Ketimine compound J | | | | | | | | | | |
| Ketimine compound K | | | | | | | | | | |
| Phosphorous ester A | | | | | 1.6 | | | | | |
| Phosphorous ester B | | | | | | 3.2 | | | | |
| Silyl ester A | | | 8.0 | | | | | | | |
| Silyl ester B | | | | 0.2 | | | | | | |
| Toluene | | | | | | | | | 20 | |
| Conc. of ketimine group [mmol/g] | 1.1 | 1.08 | 1.05 | 1.08 | 1.07 | 1.06 | 1.1 | 1.38 | 1.46 | 1.12 |
| Tack free time | 5 h | 15 h | 8 h | 8 h | 11 h | 10 h | 1.8 h | 2.5 h | 3.0 h | 1.8 h |
| Viscosity increase [times] | 1.0 | 1.0 | 1.1 | 1.2 | 1.2 | 1.2 | 1.1 | 1.5 | 1.3 | 1.1 |

|  | Examples | | | | | | Comparative Examples | | |
|---|---|---|---|---|---|---|---|---|---|
|  | 11 | 12 | 13 | 14 | 15 | 16 | 1 | 2 | 3 |
| Epoxy resin | 100 | 100 | 70 | 30 | | | 100 | 100 | 100 |
| Modified silicone | | | 30 | 70 | 100 | 100 | | | |
| Calcium carbonate | 100 | 100 | 100 | 100 | 100 | 100 | 100 | 100 | 100 |

TABLE 1-continued

| | | | | | | | | | |
|---|---|---|---|---|---|---|---|---|---|
| Ketimine compound A | | | | | | | | | |
| Ketimine compound B | | | | | | | | | |
| Ketimine compound F | | | 26 | 13 | 30 | 8 | | | |
| Ketimine compound G | | | | | | | | | |
| Ketimine compound I | | | | | | | | | |
| Ketimine compound D | | | | | | | 43 | | |
| Ketimine compound E | | | | | | | | 107 | |
| Ketimine compound H | | | | | | | | | 33 |
| Ketimine compound J | 35 | | | | | | | | |
| Ketimine compound K | | 39 | | | | | | | |
| Phosphorous ester A | | | | | | | | | |
| Phosphorous ester B | | | | | | | | | |
| Silyl ester A | | | | | | | | | |
| Silyl ester B | | | | | | | | | |
| Toluene | | | | | | | | | |
| Conc. of ketimine group [mmol/g] | 1.1 | 1.09 | 0.79 | 0.42 | 0.90 | 0.27 | 1.08 | 0.86 | 1.1 |
| Tack free time | 4 h | 13 h | 4 h | 5 h | 4 h | 6 h | 1.8 h | 5 days | 1.8 h |
| Viscosity increase [times] | 1.0 | 1.0 | 1.1 | 1.1 | 1.1 | 1.0 | >10 | 1.1 | >10 |

The unit of the compounds in the Table is parts by weight.

1) Tack free time: Time required until polyethylene film no longer adheres to the surface of the resin composition under the conditions of 20° C. and humidity of 55%.
2) Viscosity increase: The resin composition was stored at 20° C. for 1 day after its blending, and at 70° C. for another day, and the value determined by dividing the viscosity after storage at 70° C. by the viscosity after storage at 20° C. for 1 day is designated the viscosity increase.

<Components in the Table>

Epoxy resin: ELA128 (manufactured by Sumitomo Chemical Industry K.K.)

Modified silicone: MS polymer (manufactured by Kanegafuchi Chemical K.K.)

Calcium carbide: Calfine 200 (manufactured by Maruo Calcium K.K.)

Phosphorous ester A: JP360 (manufactured by Johoku Chemical K.K.)

Phosphorous ester B: JPP31 (manufactured by Johoku Chemical K.K.)

Silyl ester A: the compound represented by formula (22)

Silyl ester B: the compound represented by formula (23)

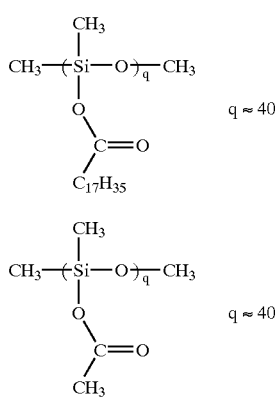

Examples 17 to 28 and Comparative Examples 4 to 6

The components were mixed at the blend ratio as shown in Table 2 to produce the resin compositions described in Examples 17 to 28 and Comparative Examples 4 to 6. The resin compositions were evaluated for their shelf stability and wet surface adhesion by the procedures as described below. The results of the evaluation are shown in Table 2.

1) Viscosity increase (times)

The viscosity increase was evaluated by the procedure similar to Examples 1 to 16 and Comparative Examples 1 to 3.

[Wet Surface Adhesion]

2) Shear stress at break (kgf/cm$^2$)

2 mortar pieces of 5 cm×5 cm×2.5 cm were immersed in water for 24 hours, and water on the surface was wiped off. One piece of the mortar to an adhesion area of 5 cm$^2$ was coated with the resin composition described in Examples 17 to 28 or Comparative Examples 4 to 6. To this mortar piece was adhered the other mortar piece with pressure, and the mortar pieces were secured to each other with a tape. Immediately after such adhesion, the mortar pieces were again immersed in water such that one mortar piece of the two mortar pieces was underneath the other, and bottom half of the piece that is underneath the other piece was immersed in water. The mortar pieces were allowed to cure for one week under such condition, and the pair of two mortar pieces were used for the test piece, which was evaluated for its shear stress at break by applying shear deformation using biaxial shear tester.

3) Matrix damage (%)

Area of the test piece matrix that was damaged at break was measured, and ratio of such area to the total adhesion area was calculated.

TABLE 2

| | Examples | | | | | | | | |
|---|---|---|---|---|---|---|---|---|---|
| | 17 | 18 | 19 | 20 | 21 | 22 | 23 | 24 | 25 |
| Epoxy resin A | 100 | 100 | 100 | 100 | 100 | 100 | 100 | 100 | 100 |
| Calcium carbonate | 100 | 100 | 100 | 100 | 100 | 100 | 100 | 100 | 100 |
| Ketimine compound A | | | | | | | 40 | | |
| Ketimine compound B | | | | | | | | | |
| Ketimine compound F | 40 | 40 | 40 | 40 | 40 | | | | |
| Ketimine compound G | | | | | | 40 | | | |
| Ketimine compound I | | | | | | | | | |
| Ketimine compound D | | | | | | | | | |
| Ketimine compound E | | | | | | | | | |
| Ketimine compound H | | | | | | | | | |
| Ketimine compound L | | | | | | | | 45 | |
| Ketimine compound M | | | | | | | | | 50 |
| Epoxy silane | 0.5 | 3.0 | 6.0 | | | 3.0 | 3.0 | | |
| Vinyl silane | | | | 3.0 | 15 | | | | |
| Viscosity increase [times] | 1.1 | 1.1 | 1.1 | 1.1 | 1.0 | 1.1 | 1.1 | 1.3 | 1.2 |
| Wet surface adhesion | | | | | | | | | |
| Shear stress [kgf/cm$^2$] | 45 | 50 | 45 | 50 | 41 | 50 | 50 | 45 | 45 |
| Matrix damage [%] | 95 | 100 | 95 | 100 | 90 | 100 | 100 | 100 | 100 |

| | Examples | | | Comparative Examples | | |
|---|---|---|---|---|---|---|
| | 26 | 27 | 28 | 4 | 5 | 6 |
| Epoxy resin A | 50 | | | 100 | 100 | 100 |
| Epoxy resin B | 50 | 100 | 100 | | | |
| Calcium carbonate | 100 | 100 | 100 | 100 | 100 | 100 |
| Ketimine compound A | | | | | | |
| Ketimine compound B | | | 25 | | | |
| Ketimine compound F | 30 | 21 | | | | |
| Ketimine compound G | | | | | | |
| Ketimine compound I | | | | | | |
| Ketimine compound D | | | | | | |
| Ketimine compound E | | | | | | |
| Ketimine compound H | | | | 40 | 40 | 40 |
| Ketimine compound L | | | | | | |
| Ketimine compound M | | | | | | |
| Epoxy silane | | | | 3.0 | | |
| Vinyl silane | | | | | | 25 |
| Viscosity increase [times] | 1.1 | 1.1 | 1.0 | >10 | >10 | >10 |
| Wet surface adhesion | | | | | | |
| Shear stress [kgf/cm$^2$] | 45 | 47 | 47 | 50 | 30 | 10 |
| Matrix destruction [%] | 100 | 95 | 95 | 100 | 40 | 15 |

The unit of the compounds in the Table is parts by weight.

<Components in the Table>

Epoxy resin A: ELA128 (manufactured by Sumitomo Chemical Industry K.K.)

Epoxy resin B: Flep 10 (an epoxy resin which contains S in its skeleton; manufactured by Toray Thiokol K.K.)

Calcium carbide: Calfine 200 (manufactured by Maruo Calcium K.K.)

Epoxy silane: 3-glycidoxypropyltrimethoxysilane

Vinyl silane: trimethoxyvinylsilane

Next, Examples of the resin composition containing a ketimine of high (not so low) polarity and a surface treated calcium carbonate are described. The components were mixed at the blend ratio as shown in Table 3, below, to thereby produce the resin composition described in Examples 29 to 31 and Comparative Examples 7 to 8. The resin compositions were evaluated as described below.

TABLE 3

| | Examples | | | Comparative Examples | |
|---|---|---|---|---|---|
| | 29 | 30 | 31 | 7 | 8 |
| Epoxy resin | 100 | 100 | 100 | 100 | 100 |
| Ketimine compound F | 38 | 15 | | | 15 |
| Ketimine compound B | | 24 | 41 | | |
| Ketimine compound I | | | | 40 | 24 |
| Surface treated calcium carbonate | 100 | 100 | 100 | 100 | 100 |
| Initial thixotropy index | 6.7 | 7.3 | 7.5 | Separation of curing agent | 5.2 |
| Viscosity increase [times] | 1.2 | 1.1 | 1.0 | | 1.5 |

The unit of the compounds in the Table is parts by weight.

1) Initial thixotropy index

Viscosity (cps) of the resin composition after its preparation was measured under the condition of 1 rpm by using a BS type viscometer. Viscosity (cps) of the resin composition after its preparation was measured under the condition of 10 rpm was also measure by a similar procedure. The thixotropy index was calculated by dividing the viscosity at 1 rpm by the viscosity at 10 rpm.

2) Viscosity increase (times)

The viscosity increase was evaluated by the procedure similar to Examples 1 to 16 and Comparative Examples 1 to 3.

The results are shown in Table 3.

Next, synthesis of silicon containing compounds which have a ketimine group, and Examples of the epoxy resin compositions containing such silicon containing compound and an epoxy resin are described.

<Synthesis of Silicon Containing Compounds Which has a Ketimine Group>

(Synthesis 13)

A flask was charged with 100 g of γ-aminopropyltrimethoxysilane (manufactured by Nippon Uniker K.K.) and 96 g of methyl isopropyl ketone (manufactured by Kuraray K.K.), and the mixture was stirred at 110° C. for 2 hours. The methanol that was produced and the excessive methyl isopropyl ketone were removed under reduced pressure to obtain silicon containing compound A which has a ketimine group.

(Synthesis 14)

The procedure of the Synthesis 13 was repeated except that 100 g of γ-aminopropyltrimethoxysilane (manufactured by Nippon Uniker K.K.) and 112 g of methyl t-butyl ketone (manufactured by Shell Japan K.K.) were used to obtain silicon containing compound B which has a ketimine group.

(Synthesis 15)

The procedure of the Synthesis 13 was repeated except that 100 g of γ-aminopropyltrimethoxysilane (manufactured by Nippon Uniker K.K.), 27.6 g of vinyltrimethoxysilane (manufactured by Nippon Uniker K.K.), and 96 g of methyl isopropyl ketone (manufactured by Kuraray K.K.) were used to obtain silicon containing compound C which has a ketimine group.

(Synthesis 16)

The procedure of the Synthesis 13 was repeated except that 100 g of γ-aminopropyltrimethoxysilane (manufactured by Nippon Uniker K.K.), 46.9 g of tetraethoxysilane (manufactured by Shin-Etsu Chemical K.K.), and 96 g of methyl isopropyl ketone (manufactured by Kuraray K.K.) were used to obtain silicon containing compound D which has a ketimine group.

(Synthesis 17)

The procedure of the Synthesis 13 was repeated except that 100 g of γ-aminopropyltrimethoxysilane (manufactured by Nippon Uniker K.K.) and 112 g of methyl isobutyl ketone were used to obtain silicon containing compound E which has a ketimine group.

Examples 32 to 39 and Comparative Examples 9 to 12

To 100 parts by weight of a main polymer comprising an epoxy resin (ELA128, manufactured by Sumitomo Chemical Industry K.K.) and/or a modified silicone (MS polymer, manufactured by Kanegafuchi Chemical K.K.) was blended the silicon containing compound which had been synthesized as described above at the proportion as described in Table 4, below, to produce one-part epoxy resin compounds. The thus produced resin compounds were evaluated for their tack free time and shelf stability by the procedure similar to Examples 1 to 16. It should be noted that the silicon containing compound F in Table 4 is represented by the following chemical structural formula.

The results are shown in Table 4.

TABLE 4

$(CH_3O)_3-Si-CH_2CH_2CH_2-N=C(CH_3)C(CH_3)_3$

| | Examples | | | | Comparative Examples | | Examples | | | | Comparative Examples | |
|---|---|---|---|---|---|---|---|---|---|---|---|---|
| | 32 | 33 | 34 | 35 | 1 | 2 | 36 | 37 | 38 | 39 | 11 | 12 |
| Epoxy resin | 100 | 100 | 100 | 100 | 100 | 100 | | | | 30 | | |
| Modified silicone | | | | | | | 100 | 100 | 100 | 70 | 100 | 100 |
| Si containing compound A | 53 | | | | | | 5 | 20 | | 30 | | |
| Si containing compound B | | 57 | | | | | | | | 20 | | |
| Si containing compound C | | | 60 | | | | | | | | | |
| Si containing compound D | | | | 60 | | | | | | | | |
| Si containing compound E | | | | | 56 | | | | | | | |
| Si containing compound F | | | | | | 56 | | | | | | |
| Tin catalyst | | | | | | | | | | | 2 | 2 |
| Vinyl silane | | | | | | | | | | | 3 | |
| Calcium carbonate | | | | | | | 100 | 100 | 100 | 100 | 100 | 100 |
| Tack free time [h] | 10 | 13 | 10 | 10 | 10 | >24 | 6 | 3 | 3 | 2 | 4 | 4 |
| Viscosity increase [times] | 1.1 | 1.0 | 1.1 | 1.1 | $x^{*1}$ | 10 | 1.1 | 1.2 | 1.1 | 1.2 | 1.2 | $x^{*2}$ |

TABLE 4-continued

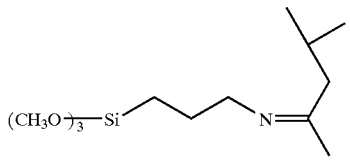

| | Examples | | | | Comparative Examples | | Examples | | | | Comparative Examples | |
|---|---|---|---|---|---|---|---|---|---|---|---|---|
| | 32 | 33 | 34 | 35 | 1 | 2 | 36 | 37 | 38 | 39 | 11 | 12 |

The unit of the compounds in the Table is parts by weight.
*1 Unmeasurable because of increase in viscosity.
*2 Unmeasurable because of curing.

<Components in the Table>

Epoxy resin A: ELA128 (manufactured by Sumitomo Chemical Industry K.K.)

Modified silicone: MS polymer (manufactured by Kanegafuchi Chemical K.K.)

Tin catalyst: tin dibutyl laurate

Calcium carbide: Calfine 200 (manufactured by Maruo Calcium K.K.)

Vinyl silane: trimethoxyvinylsilane

Examples 40 to 42 and Comparative Examples 13 to 15

An epoxy resin (ELA128, manufactured by Sumitomo Chemical Industry K.K.), a modified silicone (MS polymer, manufactured by Kanegafuchi Chemical K.K.), ketimines X and Y synthesized in the synthesis examples as described below, ketimine Z represented by the formula below (H-3, manufactured by Yuka Shell Epoxy K.K.) and other additives were blended at the proportion as shown in Table 6 to produce the resin compositions. The resin compositions were evaluated for their tensile strength, mode of breakage, and shelf stability. The results are shown in Table 5. It should be noted that the compounds in the Table were the same as those shown in Table 5.

(Synthesis 19)

A flask was charged with 200 g of 3-glycidoxypropyltrimethoxysilane (A187, manufactured by Nippon Uniker K.K.), 152 g of γ-aminopropyltrimethoxysilane (A1110, manufactured by Nippon Uniker K.K.) and 200 g of methyl isopropyl ketone, and the mixture was stirred at 110° C. for 4 hours. Excessive methyl isopropyl ketone and methanol were removed to obtain ketimine X.

(Synthesis 20)

The procedure of Synthesis 20 was repeated except that 200 g of methyl t-butyl ketone was used instead of the 200 g of methyl isopropyl ketone to produce ketimine Y.

1) Tensile strength

Tensile strength was evaluated in accordance with the procedure described in JIS K 6911. The unit is (kg/cm$^2$).

2) Mode of breakage

Mode of breakage was evaluated by observing the site of breakage with naked eye.

3) Shelf stability

Shelf stability was determined by the procedure similar to Examples 1 to 16.

TABLE 5

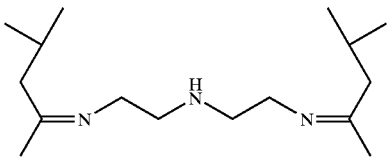

| | Examples | | Comparative Examples | | Example | Comparative Example |
|---|---|---|---|---|---|---|
| | 40 | 41 | 13 | 14 | 42 | 15 |
| Modified silicone | 100 | 100 | 100 | 100 | 70 | 70 |
| Epoxy resin | | | | | 30 | 30 |
| Tin catalyst | | | 1.5 | | | 1.5 |
| Ketimine X | 40 | | | | 40 | |
| Ketimine Y | | 40 | | | | |
| Ketimine Z | | | 40 | | | |
| Vinyl silane | | | | 2 | | |
| Calcium carbonate | 100 | 100 | 100 | 100 | 100 | 100 |
| Tensile strength [kg/cm$^2$] | 20 | 20 | 5 | 6 | 35 | 25 |
| Mode of breakage | cf | cf | af | af | cf | cf |
| Viscosity increase [times] | 1.1 | 1.1 | Cured | 1.2 | 1.2 | Cured |

The unit of the compounds in the Table is parts by weight.
cf: Breakage of compounds
af: Delamination at the boundary <Components in the Table>

Epoxy resin: ELA128 (manufactured by Sumitomo Chemical Industry K.K.)

Modified silicone: MS polymer (manufactured by Kanegafuchi Chemical K.K.)

Tin catalyst: tin dibutyl laurate

Calcium carbide: Calfine 200 (manufactured by Maruo Calcium K.K.)

Vinyl silane: trimethoxyvinylsilane

Next, synthesis of ketimines prepared by blending isocyanate group with severe steric hindrance or a silane coupling agent as a dehydration agent are described. The resulting ketimine was blended with an epoxy resin (ELA128, manufactured by Sumitomo Chemical Industry K.K.) to evaluate their shelf stability by the procedure similar to Examples 1 to 16. The results are shown in Table 6.

(Synthesis 21)

A flask was charged with 100 g of a diamine having polyether skeleton (JEFFAMINE EDR-148, manufactured by Sun Technochemical Inc.), 189 g of methyl isopropyl ketone (3.6 equivalents of the diamine), and 200 g of toluene, and the water produced was removed by azeotropic distillation. The reaction was allowed to take place for 15 hours to obtain ketimine B.

(Synthesis 22)

The procedure of Synthesis 21 was repeated except that, after the completion of the reaction, the solvent was removed, 5 g of vinyltrimethoxysilane and 10 g of methyl isopropyl ketone were added, and the reaction mixture was stirred for another 2 hours at 120° C. to thereby obtain ketimine A.

(Synthesis 23)

The procedure of the Synthesis 21 was repeated except that 100 g of a diamine having norbornane skeleton (NBDA, manufactured by Mitsui Toatsu Chemicals K.K.) was used for the amine, and ketimine D was obtained after 15 hours.

(Synthesis 24)

The procedure of Synthesis 23 was repeated except that, after the completion of the reaction, the solvent was removed, 5 g of vinyltrimethoxysilane and 10 g of methyl isopropyl ketone were added, and the stirring was continued for another 2 hours at 120° C. to thereby obtain ketimine C.

(Synthesis 25)

The procedure of Synthesis 23 was repeated except that, after reacting for 15 hours, 10 g of magnesium sulfate was added, and the stirring was continued for another 2 hours to thereby obtain ketimine E.

(Synthesis 26)

The procedure of Synthesis 23 was repeated except that, after reacting for 15 hours, 10 g of zeolite was added, and the stirring was continued for another 2 hours to thereby obtain ketimine F.

(Synthesis 27)

The procedure of Synthesis 21 was repeated except that, after reacting for 15 hours, 3 g of an isocyanate compound (TMXDI manufactured by Mitsui Cytek Chemical K.K.) was added to thereby obtain ketimine G.

(Synthesis 28)

The procedure of Synthesis 21 was repeated except that, after reacting for 15 hours, 3 g of an isocyanate compound (TMI manufactured by Mitsui Cytek Chemical K.K.) was added to thereby obtain ketimine H.

(Synthesis 29)

The procedure of Synthesis 21 was repeated except that, after reacting for 15 hours, 3 g of an isocyanate compound (TDI, manufactured by Mitsui Cytek Chemical K.K.) was added to thereby obtain ketimine J.

Examples 43 to 46 and Comparative Examples 16 to 20

An epoxy resin (ELA128, manufactured by Sumitomo Chemical Industry K.K.) and ketimines A to J synthesized in the synthesis examples as described above were mixed at the proportion as shown in Table 7, below, to produce the resin compositions. The resulting resin compositions were evaluated for their content of unreacted amine (% by weight) and shelf stability.

1) Unreacted amine (%)

Unreacted amine and ketimine compound were quantitated by gas chromatography to calculate the unreacted amine (%). The unreacted amine (%) is given by:

Unreacted amine (%)=(moles of unreacted amine compound)/(moles of ketimine compound+moles of unreacted amine compound)

2) Viscosity increase (times)

The viscosity increase was measured and evaluated by the procedure similar to Examples 1 to 16.

TABLE 6

| | E[*1] 43 | CE[*2] 16 | E44 | CE17 | CE18 | CE19 | E45 | E46 | CE20 |
|---|---|---|---|---|---|---|---|---|---|
| Ketimine compound used (Unreacted amine, %) | Ketimine A (0) | Ketimine B (4) | Ketimine C (0) | Ketimine D (4) | Ketimine E (2) | Ketimine F (4) | Ketimine G (0) | Ketimine H (0) | Ketimine I (0) |
| Epoxy resin | 100 | 100 | 100 | 100 | 100 | 100 | 100 | 100 | 100 |
| Ketimine (of the type as described above) | 40 | 40 | 38 | 38 | 38 | 38 | 38 | 38 | 38 |
| Viscosity increase of the epoxy resin blend [times] | 1.1 | 5.5 | 2.0 | 15.0 | 9.0 | 20 | 1.2 | 1.2 | 6 |

The unit of the compounds in the Table is parts by weight
[*1]E: Example
[*2]CE: Comparative Example

What is claimed is:

1. A silicon containing compound having in its backbone the structure shown in the following formula (9):

$$\left(\begin{array}{c} R^5 \\ | \\ Si-O \\ | \\ R^6 \end{array}\right)_1 $$
$$\begin{array}{c} | \\ N \\ \| \\ R^7 \diagdown C \diagup R^1 \\ | \diagdown R^2 \\ R^3 \end{array}$$ (9)

wherein $R^1$ is a member selected from the group consisting of alkyl groups containing 1 to 6 carbon atoms,
$R^2$ is methyl group or ethyl group,
$R^3$ is hydrogen atom, methyl group, or ethyl group, R⁵ is an alkyl group containing 1 to 6 carbon atoms, an alkoxy group containing 1 to 6 carbon atoms, or a monovalent siloxane derivative, R⁶ is a divalent hydrocarbon group containing or not containing nitrogen atom, R⁷ is methyl group, ethyl group or isopropyl group, and λ is an integer of at least 1.

2. A silicon containing compound comprising the structure as shown in the following formula (10):

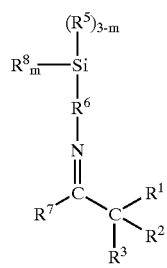

(10)

wherein R¹ is a member selected from the group consisting of alkyl groups containing 1 to 6 carbon atoms, R² is a methyl group or ethyl group, R³ is hydrogen atom, methyl group, or ethyl group, R⁵ is an alkyl group containing 1 to 6 carbon atoms, an alkoxy group containing 1 to 6 carbon atoms, or a monovalent siloxane derivative, R⁶ is a divalent hydrocarbon group containing or not containing nitrogen atom, R⁷ is methyl group, ethyl group or isopropyl group, R⁸ is a monovalent siloxane derivative, and m is an integer of 1 to 3.

3. A silicon containing compound according to claim 1 or 2 wherein said R¹, said R² and said R⁷ are methyl group, and said R³ is hydrogen atom or methyl group.

4. A one-part, room temperature moisture curable resin composition containing at least one silicon containing compound according to claim 1 or 2; and an epoxy resin and/or a modified silicone having at least two hydrolyzable alkoxysilyl groups in its molecule.

5. A method for producing said silicon containing compound according to claim 1 or 2 characterized in that said compound is obtained by heating and stirring a compound containing an alkoxysilyl group having amino group in its molecule and a ketone represented by the following formula (1):

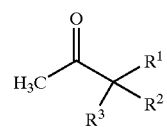

(1)

wherein R¹ is a member selected from the group consisting of alkyl groups containing 1 to 6 carbon atoms, R² is methyl group or ethyl group, and R³ is hydrogen atom, methyl group, or ethyl group.

6. A one-part, room temperature moisture curable resin composition containing at least one silicon containing compound according to claim 3; and an epoxy resin and/or a modified silicone having at least two hydrolyzable alkoxysilyl groups in its molecule.

7. A method for producing said silicon containing compound according to claim 3 characterized in that said compound is obtained by heating and stirring a compound containing an alkoxysilyl group having amino group in its molecule and a ketone represented by the following formula (1):

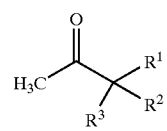

(1)

wherein R¹ is a member selected from the group consisting of alkyl groups containing 1 to 6 carbon atoms, R² is methyl group or ethyl group, and R³ is hydrogen atom, methyl group, or ethyl group.

* * * * *

UNITED STATES PATENT AND TRADEMARK OFFICE
CERTIFICATE OF CORRECTION

PATENT NO. : 6,756,466 B2
DATED : June 29, 2004
INVENTOR(S) : Hiroyuki Okuhira et al.

It is certified that error appears in the above-identified patent and that said Letters Patent is hereby corrected as shown below:

Column 36,
Lines 53-62,

" 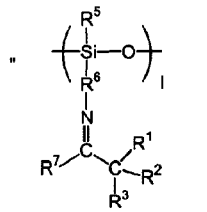 "

should read

-- 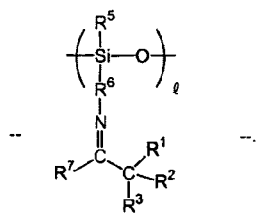 --.

Column 37,
Line 7, "λ" should read -- $\ell$ --.

Signed and Sealed this

Thirtieth Day of November, 2004

JON W. DUDAS
*Director of the United States Patent and Trademark Office*